(No Model.)
C. WILLMS.
SURGICAL BLADE AND HANDLE.
No. 327,846. Patented Oct. 6, 1885.
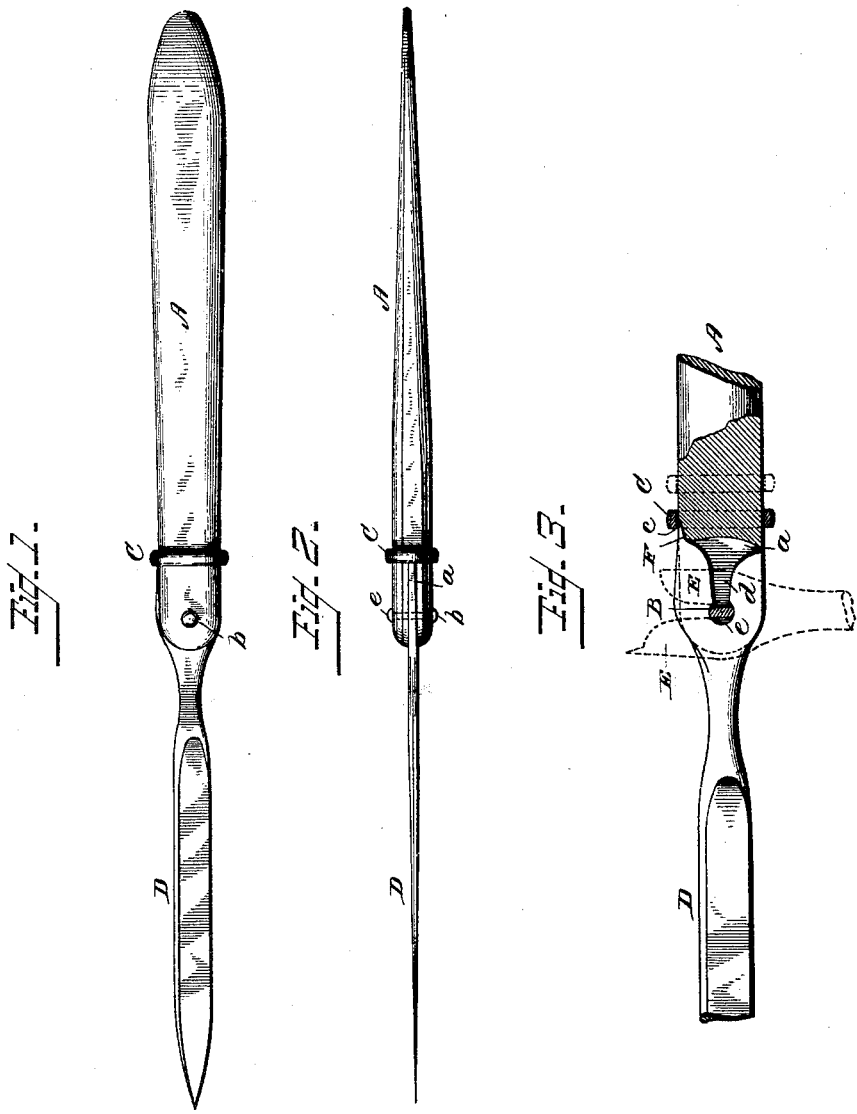

UNITED STATES PATENT OFFICE.

CHARLES WILLMS, OF BALTIMORE, MARYLAND.

SURGICAL BLADE AND HANDLE.

SPECIFICATION forming part of Letters Patent No. 327,846, dated October 6, 1885.

Application filed August 19, 1885. Serial No. 174,814. (No model.)

*To all whom it may concern:*

Be it known that I, CHARLES WILLMS, a citizen of the United States, residing at Baltimore, in the State of Maryland, have invented certain new and useful Improvements in Surgical Blades and Handles Therefor; and I do hereby declare the following to be a full, clear, and exact description of the invention, such as will enable others skilled in the art to which it appertains to make and use the same.

My invention relates to blades and a handle or holder therefor, used in surgery, and has for its object to construct a handle in a simplified way to receive different blades, and also to form the blade so as to adapt it to be held by such form of handle; and to such ends the invention consists in the construction and the combination of parts hereinafter particularly described, and then sought to be specifically defined by the claims, reference being had to the accompanying drawings, forming part of the same, and in which—

Figure 1 is a side view of the handle and blade connected together. Fig. 2 is a plan view looking down upon the top or back of the holder and blade; Fig. 3, a side view with a portion of the blade and handle broken away and the handle sectioned, to show the construction of the blade and handle where they unite, the blade being shown in one position by dotted lines. All the figures are on an enlarged scale.

In the drawings, the letter A designates the handle, formed at one end with a kerf or slot, $a$, across which, inside of the end, extends a fixed pin, B, which is preferably oval in cross-section, although it may be oblong or of such other shape in cross-section as to have one side longer than the other, as shown, so that the pin can be placed in position with its longest side at an angle to the length of the slot and handle. The pin, where it lies within the handle on opposite sides of the slot, is angular in form, preferably oval, so as to guard against the possibility of its turning; but any other form that will serve the same purpose will answer. After the pin is inserted in place its ends are formed or provided with heads $b$, in any well-known way, so as to securely hold it in place and prevent it from accidentally passing out endwise.

A slide, C, is passed around the handle, either before the pin is inserted or afterward. If afterward, its ends are united after it is made to encircle the handle. Under either way the slide is prevented from slipping off by the heads on the ends of the pin and by the taper of the handle.

The back of the handle at the base of the slot may be formed with a slight depression or recess, $c$, preferably inclined, so as to form a seat for the tail of the knife-blade. This blade D is formed with a shank, E, in which is made a slot, $d$, terminating in an enlargement or eye, $e$, preferably of the circular form. The slot at the extremity of the shank enlarges, preferably on a curve, on both sides, as illustrated, and that portion of the shank below the slot is preferably shorter than the portion above, although not necessarily so, so as to permit the easy turning of the blade into position in the slot.

From the shank above the slot there extends rearwardly a tail, F, which, preferably, tapers on its under face to its outer extremity. The purpose of this tail is to bear against the handle, so as to prevent the blade from being pushed or turned backward beyond a certain point.

The blade is placed in position by introducing it into the slot or kerf of the handle from the under side or face of the handle, as shown by dotted lines in Fig. 3. This brings the slot in the blade in line with the longest side of the fixed pin in the handle. The blade is then pressed upward till the pin of the handle enters the enlargement $e$ of the blade, when the blade can be and is turned into its operative position in line with the handle. The longest side of the pin now lies across the slot $d$ within the eye $e$, so that the blade cannot be drawn out from the slot, but is thus by the single pin locked in position as against being drawn out until it is turned downward into the position shown by dotted lines in Fig. 3. The same movement that brings the blade into this locked position also brings the tail into its seat in the back of the handle, so that it cannot be pushed farther back out of a horizontal position. The slide C is next slipped over the posterior of the tail, so as to hold the blade in position against being turned down from its horizontal position. The slide is regarded as the simplest form of device for binding the blade and handle together; but other forms may be used. The fixed pin, with its longest side in cross-section lying across the slot at an angle to the length of the handle, can be used with any other suitable means for securing the blade and handle together.

The handle can be made and sold separate from the blade, or with a set of blades of different forms for various surgical operations, the several forms having substantially the construction of shank described, which adapts them to the form of handle set forth.

The touch of the finger against the slide guards against any backward slipping of the slide.

Minor and immaterial changes in the form of the several parts can be made without departing from the spirit of my invention, which, having been described, is—

1. The handle for surgical blades, formed with a slot or kerf at its end and provided with a fixed pin lying across the slot with its longest side at an angle to the length of the handle, substantially as and for the purpose described.

2. The handle for surgical blades, formed with a slot or kerf at its end, and a recess at the base of the slot, and provided with a fixed pin lying across the slot with its longest side at an angle to the length of the handle, substantially as and for the purposes described.

3. The handle for surgical blades, formed with a slot or kerf at its end, and provided with a pin lying across the slot and a slide to bind a blade to the handle, substantially as and for the purposes described.

4. The blade for surgical use formed with a shank made with a slot terminating in an enlargement and provided with a tail extending rearwardly from the shank, substantially as described.

5. The blade formed with a shank made with a slot terminating in an enlargement and provided with a rearwardly-extending tail, in combination with a handle formed with a slot in its end and provided with a fixed pin lying across the slot, with its longest side at an angle to the length of the handle, and a slide to fit over the tail of the blade, substantially as and for the purpose described.

CHAS. WILLMS.

Witnesses:
JNO. J. FAUPEL,
JAS. L. PERRIJO.